US008768598B2

(12) United States Patent
McCollough

(10) Patent No.: US 8,768,598 B2
(45) Date of Patent: Jul. 1, 2014

(54) DUAL GAIN DIGITAL ENGINE CONTROL

(75) Inventor: James M. McCollough, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 217 days.

(21) Appl. No.: 13/337,220

(22) Filed: Dec. 26, 2011

(65) Prior Publication Data
US 2013/0166169 A1 Jun. 27, 2013

(51) Int. Cl.
*B64C 27/57* (2006.01)
*F02C 9/28* (2006.01)

(52) U.S. Cl.
CPC .. *B64C 27/57* (2013.01); *F02C 9/28* (2013.01)
USPC ............... 701/99; 701/8; 701/10; 244/195

(58) Field of Classification Search
CPC .......... F02C 9/28; B64D 31/06; B64D 31/02; G05D 1/0808; B64C 27/57
USPC ............... 701/99, 3, 8, 10; 340/945; 244/195, 244/17.13, 17, 13; 60/39.282
See application file for complete search history.

(56) References Cited

U.S. PATENT DOCUMENTS

| | | | | |
|---|---|---|---|---|
| 3,963,372 A | * | 6/1976 | McLain et al. | 416/30 |
| 4,411,595 A | * | 10/1983 | Pisano | 416/1 |
| 4,678,401 A | * | 7/1987 | Bradford et al. | 416/32 |
| 4,993,221 A | * | 2/1991 | Idelchik | 60/773 |
| 5,020,316 A | * | 6/1991 | Sweet et al. | 60/39.282 |
| 5,046,923 A | | 9/1991 | Parsons et al. | |
| 5,265,826 A | * | 11/1993 | Ebert et al. | 244/17.13 |
| 2008/0283671 A1 | | 11/2008 | Cherepinsky et al. | |
| 2009/0234554 A1 | | 9/2009 | Buchman | |

FOREIGN PATENT DOCUMENTS

EP 2101053 A2 9/2009

OTHER PUBLICATIONS

Extended European Search Report from the European Patent Office in related European Application No. 12159504, mailed Nov. 19, 2012, 6 pages.
Canadian Office Action in related Canadian patent application No. 2,794,031, 2 pages, mailed Nov. 8, 2013.

* cited by examiner

*Primary Examiner* — Tan Q Nguyen
(74) *Attorney, Agent, or Firm* — James E. Walton

(57) ABSTRACT

An engine control system having an engine, a digital engine control, and a gain logic disposed within the digital engine control for use with an aircraft. The digital engine control is configured to receive and process inputs from systems within the aircraft. Gain logic uses the inputs to generate command data to regulate the performance of the engine so as to allow rotor speed deviations from a set point.

18 Claims, 5 Drawing Sheets

US 8,768,598 B2

DUAL GAIN DIGITAL ENGINE CONTROL

BACKGROUND

1. Field of the Invention

The present application relates generally to aircraft engine performance, in particular, to a Digital Engine Control system.

2. Description of Related Art

Digital engine control systems have been around for many years. Digital engine control systems are typically used to control aspects of aircraft engine performance, such as fuel flow and rotor speed, for example. As operating conditions vary for the aircraft, rotor speed may increase or decrease. Digital engine control systems typically operate so as to maintain a relatively constant rotor speed by adjusting the fuel flow to the engine. However, adjusting the fuel flow to maintain constant rotor speeds may decrease the engine power generated.

Traditionally, hydro pneumatic engine control systems were heavily damped and did not control rotor speed with tight tolerances. As such, slight increases or decreases of rotor speeds did not trigger the hydro pneumatic engine control systems to modify fuel flow. More recently, digital engine control systems are generally more tightly monitored. Typically, slight increases or decreases of rotor speeds trigger the digital engine control system to modify fuel flow and therefore engine power.

Reducing engine power by maintaining constant rotor speeds may have negative implications. For example, during fixed collective take-offs in certification tests, a decrease in engine power may cause the helicopter to lose too much altitude, thereby unsuccessfully performing a certification requirement. In order to compensate for the digital engine control system, a pilot may manually increase engine power. However, increasing power may negatively affect the aircraft's IGE hover performance.

Although great strides have been made in digital engine control systems, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
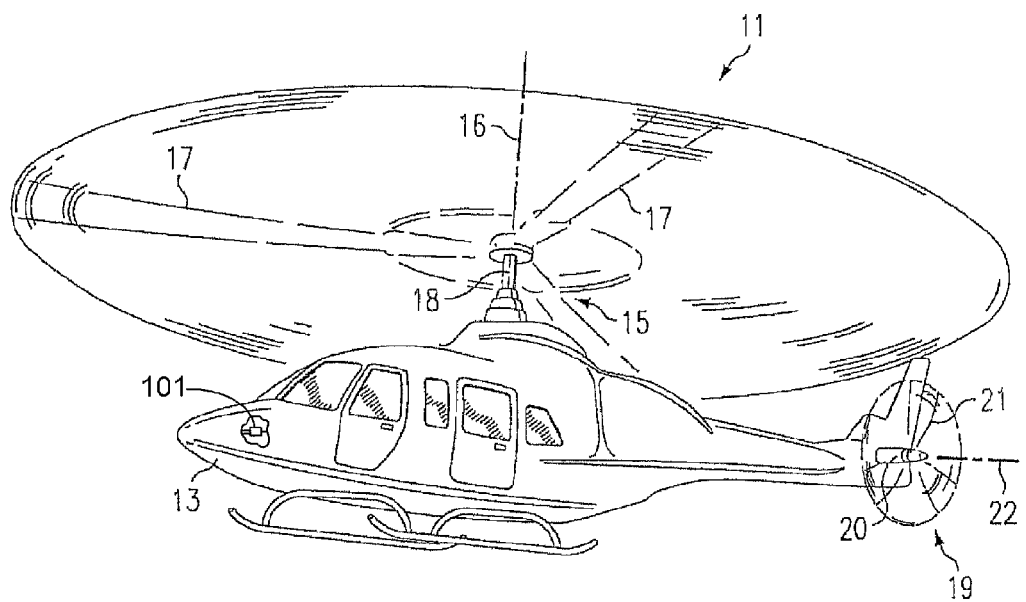
FIG. 1 is a perspective view of an engine control system located within a body of an aircraft according to the preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIG. 1 in the drawings, an aircraft, such as a helicopter 11, having an engine control system 101 is illustrated. Helicopter 11 has a body 13 and a main rotor assembly 15, including main rotor blades 17 and a main rotor shaft 18. Helicopter 11 has a tail rotor assembly 19, including tail rotor blades 21 and a tail rotor shaft 20. Main rotor blades 17 generally rotate about a longitudinal axis 16 of main rotor shaft 18. Tail rotor blades 21 generally rotate about a longitudinal axis 22 of tail rotor shaft 20. Helicopter 11 also includes engine control system 101 within body 13 according to the present disclosure for controlling the performance of engines 105 (see FIG. 2) on helicopter 11.

Although described as using system 101 with helicopter 11, it is understood that system 101 may be used on any aircraft such as, fixed wing aircraft and tilt-rotor aircraft, for example. Furthermore, system 101 is not so limited to aircraft. It is understood that system 101 is configured to control a multitude of different engines, irregardless of the engine's purpose or function. For purposes of this application, discussion will focus on controlling engine performance in helicopter 11.

Figure 2:
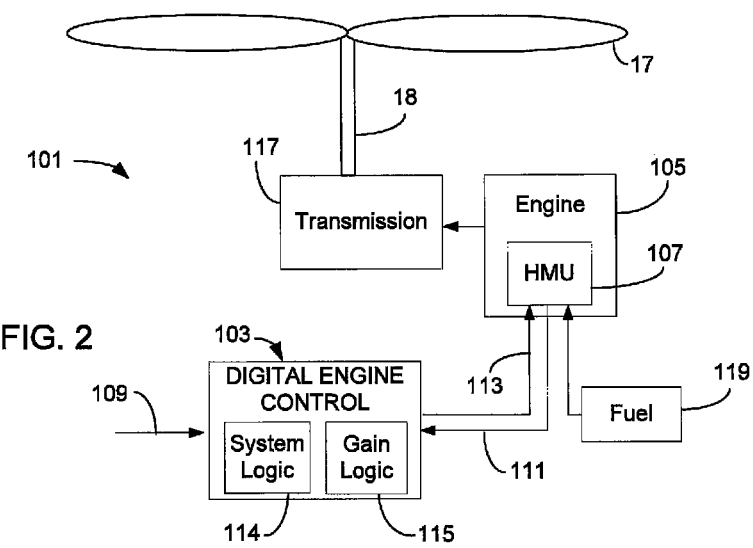
FIG. 2 is a schematic of the engine control system of FIG. 1, including a digital engine control.

Referring now also to FIGS. 2 in the drawings, a schematic of engine control system 101 is illustrated. Engine control system 101 includes a digital engine control 103 including a take-off gain logic 115, an engine 105, and a fuel delivery device 107. System 101 is configured to selectively control the quantity of fuel flow to engine 105, thereby allowing engine power to increase or decrease inversely as the rotor speed increases or decreases. System 101 is configured to vary the quantity of fuel flow when rotor speed exceeds a boundary limit 403 (see FIG. 4) and/or when rotor speed deviates from a set point 401 (see FIG. 4) for a selected time period $T_2$.

Digital engine control 103 is a system including one or more components and accessories that control aspects of engine performance. Digital engine control 103 may be a full authority digital engine control or limited authority digital engine control. A full authority control can be programmed to shut an engine down when certain conditions are met instead of performing a temporary action, such as going to idle speed, to allow the pilot time to analyze the situation and take the necessary steps to correct the problem, as in the case with a limited authority digital engine control.

Digital engine control 103 is configured to receive inputs 109 originating from pilot controls or other aircraft systems operating in conjunction with helicopter 11. For example, the pilot (not shown) may transmit an input 109 by adjusting the cyclic or collective to alter flight characteristics of helicopter 11. Additionally, inputs 109 may originate from a flight control computer or other systems and sub-systems on helicopter 11 or remote to helicopter 11 via wireless communications. Digital engine control 103 is also conductively coupled to, and in communication with, engines 105 and device 107, thereby receiving an input 111. Examples of inputs 109, 111 to digital engine control 103 may include, but are not limited to, power turbine output speed, measured gas temperature, collective pitch position, throttle position, compressor speed, engine torque output, pressure altitude, air temperature entering the compressor, fuel metering valve position, and rotor speed set point 401. Communication between elements within system 101 may be performed through the use of wired or wireless communications.

Digital engine control 103 continuously monitors and receives inputs 109 and 111 from helicopter 11. Digital engine control 103 is programmed to process inputs 109 and 111 through system logic 114 and/or through take-off gain logic 115 and generate a command data 113 to control engine performance. System logic 114 and gain logic 115 are programmed operations within digital engine control 103. Gain logic 115 may be programmed into digital engine control 103 at any time and function with existing parameters within digital engine control 103. For example, gain logic 115 may be programmed into digital engine control 103 prior to manufacture or after manufacture as a retrofit operation.

Engine 105 is conductively coupled to digital engine control 103 and device 107. A gear ratio exists between engine 105 and rotor speed as long as engine 105 is driving the rotor. Engine 105 is configured to drive transmission 117. Transmission 117 therefore rotates blades 17 by rotating main rotor shaft 18. Therefore, power turbine output speed is proportional to rotor speed during powered flight.

Device 107 is operably and conductively coupled to engine 105 and conductively coupled to digital engine control 103. Device 107 is configured to deliver fuel to engine 105 at a variety of flow rates. An example of device 107 is a hydro mechanical unit (HMU). Device 107 is coupled to and accesses fuel from a fuel source 119, and based upon command data 113, device 107 provides fuel to engine 105. Fuel source 119 is configured to be a container or closed unit for the temporary storage of fuel. The fuel may be any type of fuel that can operate engine 105. For purposes in this embodiment, the fuel will be liquid and consistent with the type of fuel ordinarily used in aircraft engines. It is understood that the fuel used in system 101 is not limited to liquid fuel and that other fuel may be used. Furthermore, the fuel may be in any of the following states: solid, liquid, or gas. Although system 101 has been described as adjusting the fuel flow to regulate the rotor speed, it is understood that the rotor speed may be regulated by adjusting other parameters of an aircraft.

Figure 4:
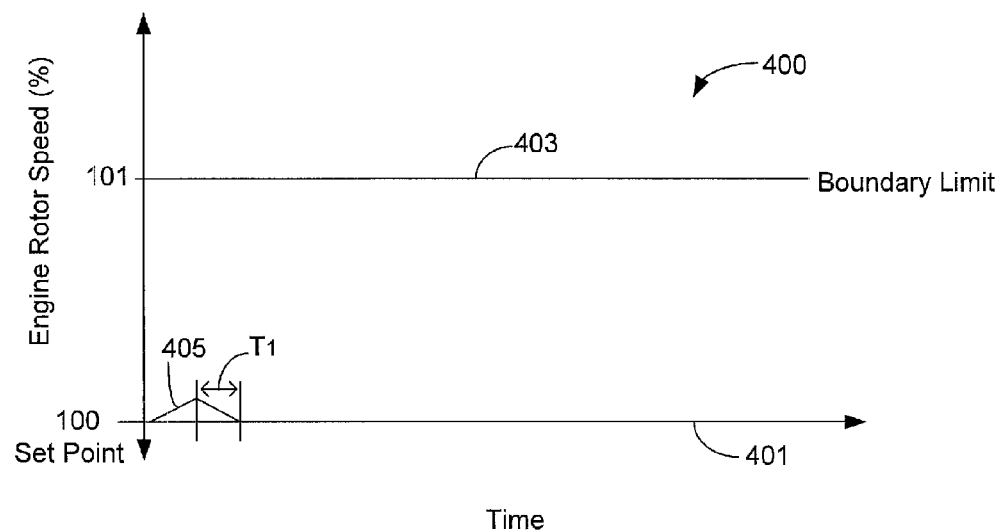
FIG. 4 is a graph of how system logic within the digital engine control of FIG. 2 responds to changes in rotor speed.
Figure 5:
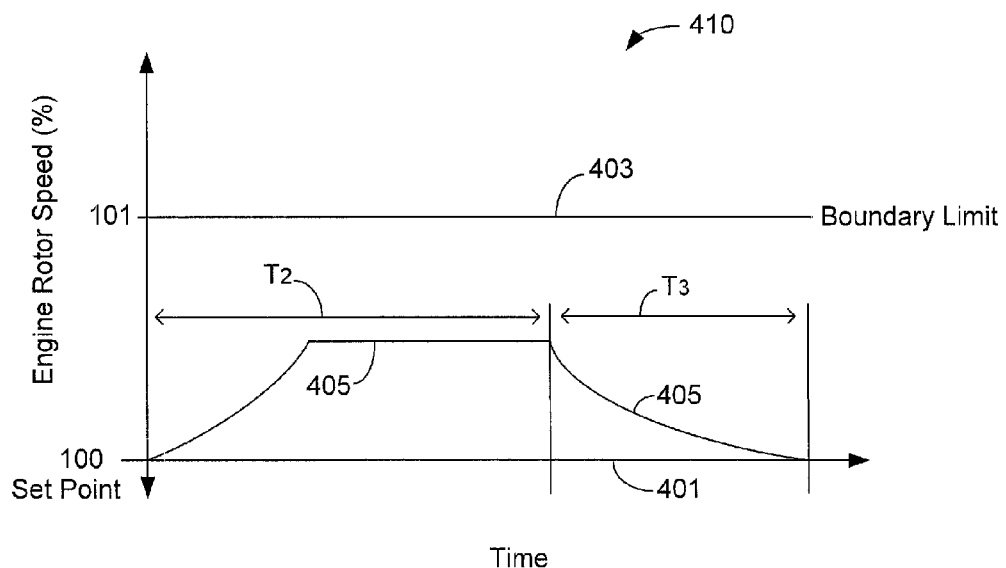
FIGS. 5 and 6 are graphs of how gain logic within the digital engine control of FIG. 2 responds to changes in rotor speed.
Figure 6:
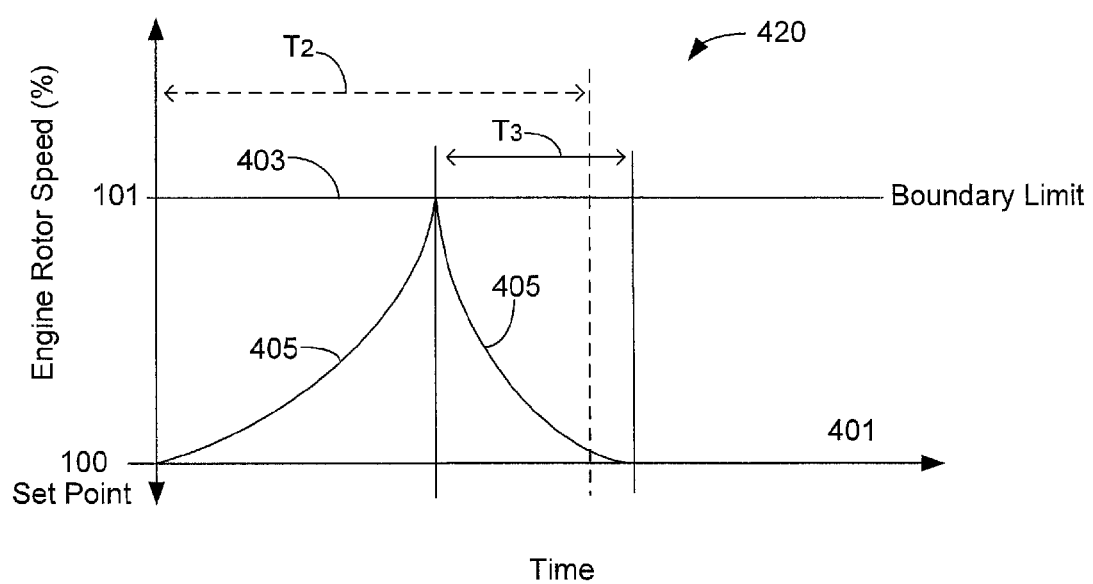

Referring now also to FIGS. 4, 5, and 6 in the drawings, graphs 400, 410 and 420 showing the functional operations of system logic 114 and gain logic 115 within system 101 are illustrated. Digital engine control 103 is programmed to use gain logic 115 and/or system logic 114. For example, digital engine control 103 may use only system logic 114 or gain logic 115 to regulate rotor speed. Furthermore, digital engine control 103 may be programmed to use both system logic 114 and gain logic 115 together.

Depending on a variety of flight conditions and environmental conditions, blades 17 may experience an increase or decrease in efficiency and/or load, resulting in an increase or decrease in rotor speed. It is this variation in rotor speed that system 101 is configured to control and regulate. For example, as helicopter 11 airspeed increases from hover to forward flight, the rotor becomes more aerodynamically efficient. This efficiency increase results in a decrease in load on the rotor drive system and therefore an increase in rotor speed when engine 105 is producing constant power. Such an example is seen with fixed-collective take-offs. Digital engine control 103 is programmed to recognize the change in rotor speed and send command data 113 to device 107 in response to the rotor speed increase. System logic 114 and gain logic 115 are programmed to respond differently to such variations in rotor speed. FIGS. 4, 5, and 6 illustrate how system logic 114 and gain logic 115 respond to rotor speed variations.

As seen in FIGS. 4, 5, and 6, digital engine control 103 is programmed to have set point 401 corresponding to a selected speed of rotation for blades 17. Set point 401 may be any rotor speed. Set point 401 is a characteristic of each aircraft and therefore chosen based upon selected design-related and system-related constraints. As such, FIGS. 4, 5, and 6, depict set point 401 as being 100 percent rather than a designated rotor speed. Set point 401 represents the optimal rotor speed for the particular aircraft.

Additionally, digital engine control 103 is programmed to have a soft boundary limit 403. The value of boundary limit 403 is predetermined and programmed into digital engine control 103. Boundary limit 403 may be any value above and/or below set point 401. Where multiple boundary limits 403 are used, boundary limits 403 may be distinguished in relation to set point 401 by using terms, such as upper and lower. For purposes here, boundary limit 403 is set at a rotor speed 1 percent higher than set point 401.

Some embodiments of digital engine control 103 may vary boundary limit 403 to specific environments and flight conditions. For example, in one situation, boundary limit 403 is 1 percent above and below set point 401. In another situation boundary limit 403 may be set at 0.5 percent above and below set point 401. Flight conditions and environmental conditions may influence the value of boundary limit 403 before and during flight, such that a pilot may set boundary limit 403 or digital engine control 103 may be programmed to automatically adjust the value of boundary limit 403 in response to selected inputs 109 and 111.

Although digital engine control 103 has been described as having boundary limit 403 above and/or below set point 401, it is understood that digital engine control 103 may use a single boundary limit 403 in relation to set point 401. For example, boundary limit 403 may be 1 percent above set point 401. Furthermore, where multiple boundary limits 403 are used, it is understood that the upper and lower limits may vary in value from set point 401.

As seen in particular with FIG. 4, graph 400 illustrates how system logic 114 is programmed to respond to variations in rotor speed 405. System logic 114 is programmed to respond to variations in rotor speed. As digital engine control 103 detects an increase in rotor speed 405 above set point 401, system logic 114 transmits command data 113 to device 107 to decrease the fuel flow to return rotor speed 405 to set point 401. Inner parameters within system logic 114 determine the degree to which rotor speed 405 may vary before transmitting command data 113 to device 107. System logic 114 is programmed to return the rotor speed to set point 401 within a duration denoted by a return time constant $T_1$.

Return time constant $T_1$ is parameter within system logic 114 and may vary depending on inputs 109 and 111. In other words, return time constant $T_1$ may be a predetermined value applicable for all flight situations. For example, return time constant $T_1$ may be set at 5 seconds. In another example, return time constant $T_1$ may be variable in that the duration of return time constant $T_1$ is situationally dependent. For example, return time constant $T_1$ may be determined by processing inputs 109 and 111 and selecting a predetermined duration or selecting a calculated duration based upon current inputs 109 and 111. Inputs 109 and 111 that may be considered is any input value measured by systems used to operate helicopter 11. The listing made previously regarding inputs 109 and 111 apply equally here.

As seen in particular with FIG. 5, graph 410 illustrates a couple ways in which gain logic 115 is programmed to respond to variations in rotor speed. Gain logic 115 is programmed to monitor and receive inputs 109 and 111 from helicopter 11 and send command data 113 much like system logic 114. Take-off gain logic 115 is programmed to send command data 113 to return rotor speed 405 back to set point 401 when at least one of a durational time constant $T_2$ is reached and/or the rate of change of rotor speed 405 exceeds an operational limit.

Gain logic 115 is programmed to permit deviations of rotor speed 405 from set point 401 for a designated time period denoted by durational time constant $T_2$. Such deviations are allowed because some maneuvers may require slight variations in rotor speed to perform. For example, a fixed-collective take off may necessitate an increase in rotor speed for a period of time to successfully perform certification flight tests.

Durational time constant $T_2$ is a parameter programmed into gain logic 115. Durational time constant $T_2$ may be any duration but is chosen by one of ordinary skill in the art based upon design-related and/or system-related constraints. For example, durational time constant $T_2$ may be a time period of eight to ten seconds. Durational time constant $T_2$ acts as a timer. The timer begins to run as soon as a deviation in rotor speed 405 from set point 401 is detected. In instances where rotor speed 405 returns to set point 401 before durational time constant $T_2$ is exhausted, durational time constant $T_2$ resets in anticipation of another deviation. In such instances, flight conditions and/or environmental conditions that caused rotor speed 405 to deviate may only have been temporary, thereby permitting rotor speed 405 to return to set point 401 without involvement of gain logic 115.

In instances where rotor speed 405 deviates from set point 401 for the entire duration of durational time constant $T_2$, gain logic 115 is programmed to transmit command data 113 to device 107 to return rotor speed 405 back to set point 401. Rotor speed 405 is returned to set point 401 within a duration denoted by a return time constant $T_3$. Return time constant $T_3$ is similar to that of return time constant $T_1$, having the same features, functions, and limitations as described above.

Gain logic 115 is also programmed to return rotor speed 405 to set point 401 if the rate of change of rotor speed 405 exceeds an operational limit. In such an instance, the necessary command data 113 would be generated and transmitted by gain logic 115 to return rotor speed 405 to set point 401 within return time constant $T_3$ irregardless of durational time constant $T_2$. For example, as seen in FIG. 5, rotor speed 405 increased above set point 401 and then leveled out to a constant elevated speed above set point 401. If the rate of change of rotor speed 405 does not exceed the operational limit, then the deviation is permitted to continue, governed by durational time constant $T_2$ and boundary limit 403. If the rate of change of rotor speed 405 exceeded the operational limit, gain logic 115 is programmed to transmit command data 113 to adjust fuel flow and return rotor speed 405 to set point 401 without waiting for the entire durational time constant $T_2$.

Like durational time constant $T_2$, the operational limit is a parameter programmed into gain logic 115 representing an allowable rate of change of rotor speed 405. The operational parameter may be set at any rate of increase or decrease. Furthermore, the operational parameter may be predetermined or situationally dependent like unto return time constant $T_1$ discussed previously.

As seen in particular with FIG. 6, graph 420 illustrates another way in which gain logic 115 is programmed to respond to variations in rotor speed. As seen in FIG. 5, rotor speed 405 continued to increase for a selected time period but then remained constant at an elevated level. Situations may arise where rotor speed 405 continues to increase or decrease within operational limits but eventually reaches boundary limit 403 before durational time constant $T_2$ has expired. In such situations, gain logic 115 is programmed to respond similarly to that of system logic 114. Gain logic 115 sends command data 113 to adjust fuel flow to engine 105 to return rotor speed 405 to set point 401 upon reaching boundary limit 403 within return time constant $T_3$.

Although system logic 114 and gain logic 115 are described as using return time constant $T_1$ and $T_3$, it is understood that return time constants $T_1$ and $T_3$ may have the same functions, limitation, and features.

In the preferred embodiment, digital engine control 103 includes both system logic 114 and gain logic 115. Gain logic 115 and system logic 114 are programmed to accept and use similar parameters and inputs 109, 111. Each may generate command data 113 based upon processing of selected inputs 109, 111.

Digital engine control 103 is configured to selectively use system logic 114 and/or gain logic 115. Digital engine control 103 may use both system logic 114 and gain logic 115 in one embodiment. In such an embodiment, signals from each logic 114 and 115 may be summed algebraically to generate command data 113. In another embodiment, digital engine control 103 may use a single logic 114, 115. For example, digital engine control 103 may be programmed so as to use gain logic 115 at all times. In another embodiment, digital engine control 103 is configured to selectively alternate between system logic 114 and gain logic 115. In alternating, digital engine control 103 may operate in a manual mode or in an automatic mode. Engine control system 101 may be programmed to perform in only one mode or may alternate between modes.

In a manual mode configuration, a control device may be used to send input 109 to digital engine control 103 to alternate between logic 114 and 115. The control device is selectively controlled by a user, such as a pilot or crew on helicopter 11. The control device may incorporate the use of a switch, voice activated command, digital display selection, or other method to permit the user to alternate between logic 114 and 115 as desired. Switching between logic 114 and 115 may be performed prior to flight or during flight depending on system constraints. For example, certain flight situations may warrant the use of a particular logic 114, 115. In manual mode, engine control system 101 has the ability to override the selection of the user or prevent the user from alternating between logic 114, 115. In such a way, manual mode may be situationally dependent through actions of the user manually selecting logic 114, 115 or through digital engine control 103 overriding the selection of the user. Digital engine control 103 may override the manual selection of the user in critical situations, such as where operational parameters of the aircraft may be exceeded, safety of the aircraft may be at risk, or in emergency situations.

Likewise, in an automatic mode configuration, digital engine control 103 processes inputs 109 and 111. Based upon inputs 109 and 111, digital engine control 103 determines which logic 114, 115 is best suited for the given flight conditions. In this mode, the selection of logic 114 or 115 is situationally dependent wherein a predetermined selection between logic 114 and 115 is chosen prior to flight based upon flight plans or expectant flight conditions. Additionally, the selection of logic 114 or 115 may be chosen during flight based upon current flight conditions as described previously. Particular inputs 109, 111 that may be used by digital engine control 103 in determining the specific logic 114, 115 to use are, but not limited to, flight speed, collective position, elevation, height above ground, and so forth. Such inputs 109, 111 are not meant to be limiting. Additional inputs 109, 111 may be used.

As an example of digital engine control 103 using an input 109 to selectively alternate between logic 114, 115 in automatic mode, the following examples are illustrative. Digital engine control 103 may be programmed to monitor the air or ground speed of helicopter 11 from a number of devices, such as global positioning satellites or Doppler, for example. If the air or ground speed of helicopter 11 is between zero and thirty knots, digital engine control 103 is programmed to use gain logic 115. If the air or ground speed of helicopter 11 is above thirty knots, digital engine control 103 is programmed to use system logic 114. In another example, digital engine control 103 may be programmed to monitor the height of helicopter 11 above the ground. If helicopter 11 is within a selected height range to the ground, digital engine control 103 is programmed to select gain logic 115 rather than system logic 114. The above examples are illustrative of how digital engine control 103 may be programmed to selectively alternate automatically between logic 114 and 115 during flight. It is understood that other methods and inputs 109,111 may be used.

Figure 7:
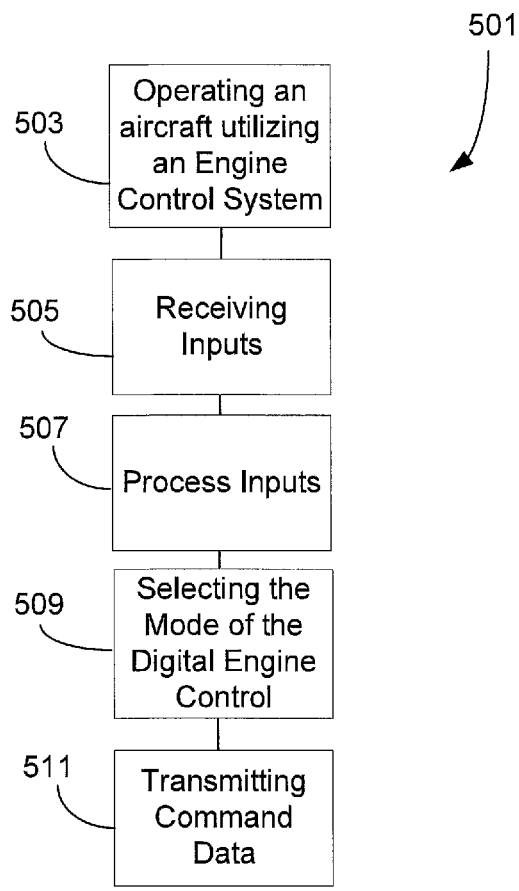
FIG. 7 is a chart of the method of operating the engine control system of FIG. 1.

Referring now also to FIG. 7 in the drawings, a chart 501 showing the method of using engine control system 101 is illustrated. Engine control system 101 is installed and operational on an aircraft. An aircraft utilizing 503 engine control system 101 is operated. Engine control system 101 includes a digital engine control for receiving 505 inputs from a plurality of sources including additional sensors and systems on the aircraft and the pilot. The inputs are processed 507 in one of system logic and/or gain logic. The gain logic and/or system logic is stored on the digital engine control. Once processed, command data is transmitted 511 to the engine to regulate engine performance. The digital engine control processes 507 the inputs and transmits 511 command data according to the mode of the digital engine control, manual or automatic. The mode may be selected 509 prior to flight or during flight.

Figure 3:
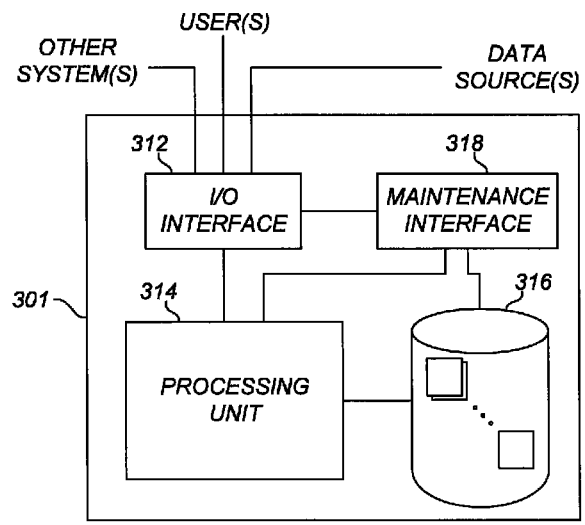
FIG. 3 is a schematic of a controller for use in the engine control system of FIG. 1.

Referring now also to FIG. 3 in the drawings, system 101 may use digital engine control 103 or a general computerized device such as controller 301 to send command data 113 and receive inputs 109 and 111. Controller 301 includes an input/output (I/O) interface 312, a processing unit 314, a database 316, and a maintenance interface 318. Alternative embodiments can combine or distribute input/output (I/O) interface 312, processing unit 314, database 316, and maintenance interface 318 as desired. Embodiments of the Controller 301 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers includes a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. For example, one or more functions of system 101, including system logic 114 and/or gain logic 115 may be performed on machines located within the aircraft or external to the aircraft. Machines external to the aircraft may be located on, but not limited to, the ground, on a ship, in a vehicle, or within a structure, to name a few. It should also be appreciated that such machines need not be dedicated to performing tasks described herein. In such instances, portions of controller 301 can be multi-purpose machines, for example computer workstations, that are suitable for also performing other tasks.

I/O interface 312 provides a communication link between external users, systems, and data sources and components of system 101. I/O interface 312 can be configured for allowing one or more users to input information to system 101 via any known input device. Examples can include a keyboard, mouse, touch screen, microphone, and/or any other desired input device. I/O interface 312 can be configured for allowing one or more users to receive information output from system 101 via any known output device. Examples can include a display monitor, a printer, a speaker, and/or any other desired output device. I/O interface 312 can be configured for allowing other systems to communicate with system 101. For example, I/O interface 312 can allow one or more remote computer(s) to access information, input information, and/or remotely instruct system 101 to perform one or more of the tasks described herein. I/O interface 312 can be configured for allowing communication with one or more remote data sources. For example, I/O interface 312 can allow one or more remote data source(s) to access information, input information, and/or remotely instruct system 101 to perform one or more of the tasks described herein.

The database 316 provides persistent data storage for system 101. While the term "database" is primarily used, a memory or other suitable data storage arrangement may provide the functionality of database 316. In alternative embodiments, database 316 can be integral to or separate from system 101 and can operate on one or more computers. Database 316 preferably provides non-volatile data storage for any information suitable to support the operation of system 101.

Maintenance interface 318 is configured to allow users to maintain desired operation of system 101. In some embodiments, maintenance interface 318 can be configured to allow for reviewing and/or revising the data stored in database 316 and/or performing any suitable administrative tasks commonly associated with database management. This can include, for example, updating database management software, revising security settings, and/or performing data backup operations. In some embodiments, maintenance interface 318 can be configured to allow for maintenance of processing unit 314 and/or the I/O interface 312. This can include, for example, software updates and/or administrative tasks such as security management and/or adjustment of certain tolerance settings. Processing unit 314 can include various combinations of one or more processors, memories, and software components. Processing unit 314 can include specific programming to operate system logic 114 and/or gain logic 115.

The mixing and matching of features, elements, and/or functions between various embodiments is expressly contemplated herein so that one of ordinary skill in the art would appreciate from this disclosure that features, elements, and/or functions of one embodiment may be incorporated into another embodiment as appropriate, unless described otherwise above.

The current application has many advantages over the prior art including the following: (1) use of gain logic within the digital engine control; (2) ability of the digital engine control to operate according to system logic and/or gain logic; (3) the ability to alternate between system logic and gain logic in at least one of two modes, such as manual and automatic; (4) a manual mode where the user can switch between logic at any time; (5) an automatic mode wherein the digital engine control alternates between the logic; (6) logic that permits deviation from a set point for a durational time period; and (7) logic that automatically corrects changes in rotor speed when the rate of change exceeds an operational limit or when rotor speed exceeds a boundary limit.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. An engine control system for an aircraft, comprising:
    an engine disposed within the aircraft;
    a digital engine control disposed on the aircraft and being configured to receive and process inputs from the aircraft; and
    a gain logic stored on the digital engine control for utilizing the inputs and transmitting command data to the engine to allow rotor speed deviations from a set point, thereby regulating the performance of the engine, the gain logic allows rotor speed deviations from the set point for a selected durational time constant.

2. The engine control system of claim 1, wherein the durational time constant resets when the rotor speed returns to the set point.

3. The engine control system of claim 1, wherein the gain logic returns the rotor speed to the set point when the rotor speed exceeds an operational limit.

4. The engine control system of claim 3, wherein the operational limit is an acceptable rate of change of the rotor speed.

5. The engine control system of claim 1, wherein the gain logic returns the rotor speed to the set point when the rotor speed exceeds a boundary limit.

6. The engine control system of claim 1, further comprising:
    a system logic stored on the digital engine control for utilizing the inputs and transmitting the command data to the engine to maintain the rotor speed at the set point;
    wherein the digital engine control is programmed to selectively alternate between system logic and gain logic to regulate the performance of the engine.

7. The engine control system of claim 6, further comprising:
    a control device disposed on the aircraft, the control device being configured to allow a user to manually select between system logic and gain logic.

8. The engine control system of claim 7, wherein the digital engine control is programmed to override the control device during critical situations.

9. The engine control system of claim 6, wherein the selection between system logic and gain logic is performed automatically by the digital engine control.

10. The engine control system of claim 6, wherein the command data is transmitted wirelessly to the engine.

11. The engine control system of claim 1, wherein the digital engine control is a full authority digital engine control.

12. The engine control system of claim 1, wherein the digital engine control is a limited authority digital engine control.

13. The engine control system of claim 1, wherein the digital engine control is remote from the aircraft.

14. A method of controlling an engine of an aircraft, comprising:
    utilizing an engine control system to control rotor speed of rotor blades of the aircraft at a selected set point;
    providing a digital engine control within the engine control system;
    receiving inputs within the digital engine control;
    storing a gain logic on the digital engine control;
    storing a system logic on the digital engine control;
    processing the inputs with at least one of the gain logic and the system logic to generate command data; and
    transmitting the command data from the digital engine control to the engine for permitting deviations in the rotor speed from the set point.

15. The method of claim 14, wherein the digital engine control is programmed to alternate between the system logic and the gain logic.

16. The method of claim 15, wherein the digital engine control is operable in either a manual mode or an automatic mode.

17. The method of claim 16, wherein, in the manual mode, a user of the aircraft manually selects between the system logic and the gain logic.

18. The method of claim 16, wherein, in the automatic mode, the digital engine control automatically selects between the system logic and the gain logic.

* * * * *